US009073152B2

(12) United States Patent (10) Patent No.: US 9,073,152 B2
Westwood et al. (45) Date of Patent: Jul. 7, 2015

(54) ELLIPTICAL BEARING MANIPULATOR

(75) Inventors: Sheldon Dirk Westwood, Albany, NY (US); Mark Stephen Clough, Dallas, TX (US); James Alfred Day, Dallas, TX (US); Paul Howard Davidson, Albany, NY (US); David Britton Green, Dallas, TX (US); Francisco Jesus Godines, Dallas, TX (US); Troy Eugene Mallory, Dallas, TX (US); Michael Wayne Quillin, Dallas, TX (US)

(73) Assignee: General Electric Company, Schenectady, NY (US)

( * ) Notice: Subject to any disclaimer, the term of this patent is extended or adjusted under 35 U.S.C. 154(b) by 915 days.

(21) Appl. No.: 13/289,105

(22) Filed: Nov. 4, 2011

(65) Prior Publication Data

US 2013/0115032 A1  May 9, 2013

(51) Int. Cl.
*B23K 37/04* (2006.01)
*B21C 37/00* (2006.01)
*B23Q 1/40* (2006.01)

(52) U.S. Cl.
CPC ............. *B23K 37/0435* (2013.01); *B21C 37/00* (2013.01); *B23Q 1/40* (2013.01); *B23K 37/0452* (2013.01); *B23K 37/0461* (2013.01)

(58) Field of Classification Search
CPC ............. B21C 37/00; B23Q 1/40; B23Q 3/06
USPC ................... 269/289 MR, 289 R, 55, 60, 71; 29/281.1, 281.3, 281.4, 281.5
See application file for complete search history.

(56) References Cited

U.S. PATENT DOCUMENTS

| | | | | | |
|---|---|---|---|---|---|
| 4,295,257 | A | * | 10/1981 | Strohs | 29/240 |
| 5,092,028 | A | * | 3/1992 | Harnden | 29/709 |
| 5,673,843 | A | * | 10/1997 | Gainey | 228/44.5 |
| 5,725,205 | A | * | 3/1998 | O'Berg | 269/37 |
| 2010/0244347 | A1 | * | 9/2010 | Davi | 269/71 |
| 2012/0298725 | A1 | * | 11/2012 | Biggs | 228/2.1 |
| 2013/0115032 | A1 | * | 5/2013 | Westwood et al. | 414/433 |

OTHER PUBLICATIONS

Ergo Chief, Motorized Rotary Work Positioner Brochure, Ergotech, Inc., Nov. 2010, 2 pages.

* cited by examiner

*Primary Examiner* — Lee D Wilson
(74) *Attorney, Agent, or Firm* — Ernest G. Cusick; Hoffman Warnick LLC

(57) ABSTRACT

A bearing manipulator for supporting and manipulating a bearing is provided. In one embodiment, the bearing manipulator includes a frame having at least one adjustable roller to support the bearing, and at least one adjustable arm to secure the bearing to the frame. The bearing manipulator further includes a motor configured to incrementally rotate the bearing.

18 Claims, 4 Drawing Sheets

ELLIPTICAL BEARING MANIPULATOR

BACKGROUND OF THE INVENTION

Aspects of the invention provide for an apparatus and a method for manipulating and supporting a large mechanical object. Specifically, the subject matter disclosed herein relates to an elliptical bearing manipulator for supporting and manipulating a bearing.

Bearings are used in a wide variety of applications to allow constrained relative motion between parts during rotation. Often, a user desires to weld a sacrificial, softer layer of metal on to the inner surface of the bearing to further protect the moving parts during rotation. For example, an alloy comprising a metal matrix composite, referred to as a Babbitt metal, can be welded onto the surface of a bearing. Welding the Babbitt metal onto a large bearing (such as a bearing used in a turbomachine) is a cumbersome and physically intensive procedure since the bearing needs to be manipulated by an operator, and usually a crane, to be in position for welding. After each weld, the bearing needs to be repositioned for the next weld. Each repositioning requires an operator to push/pull the bearing into position, and given the large size and weight of the bearings, can require a crane and special equipment. Also, in known systems for supporting a bearing, each bearing typically needs to be modified to fit in the system.

BRIEF DESCRIPTION OF THE INVENTION

A bearing manipulator for supporting and manipulating a bearing is provided. In one embodiment, the bearing manipulator includes a frame having at least one adjustable roller to support the bearing, and at least one adjustable arm to secure the bearing to the frame. The bearing manipulator further includes a motor configured to incrementally rotate the bearing. In one embodiment, the motor is coupled to the at least one adjustable arm which in turn rotates the bearing. The degree to which the bearing is rotated each time can be equivalent to a width of a weld applied to the bearing. In this way, a bearing can be rotated incrementally so that a weld can be applied to an entire inner surface of the bearing.

A first aspect of the invention includes an elliptical bearing manipulator comprising: a frame including: at least one adjustable roller configured to support a bearing; at least one adjustable arm configured to attach to the bearing; and a motor configured to incrementally rotate the bearing.

A second aspect of the invention includes a method of manipulating a bearing, the method comprising: providing a frame adapted for supporting the bearing, the frame having at least one adjustable roller configured to support the bearing and at least one adjustable arm configured to attach to the bearing; placing the bearing on the at least one adjustable roller; and using a motor to incrementally rotate the bearing.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

Figure 1:
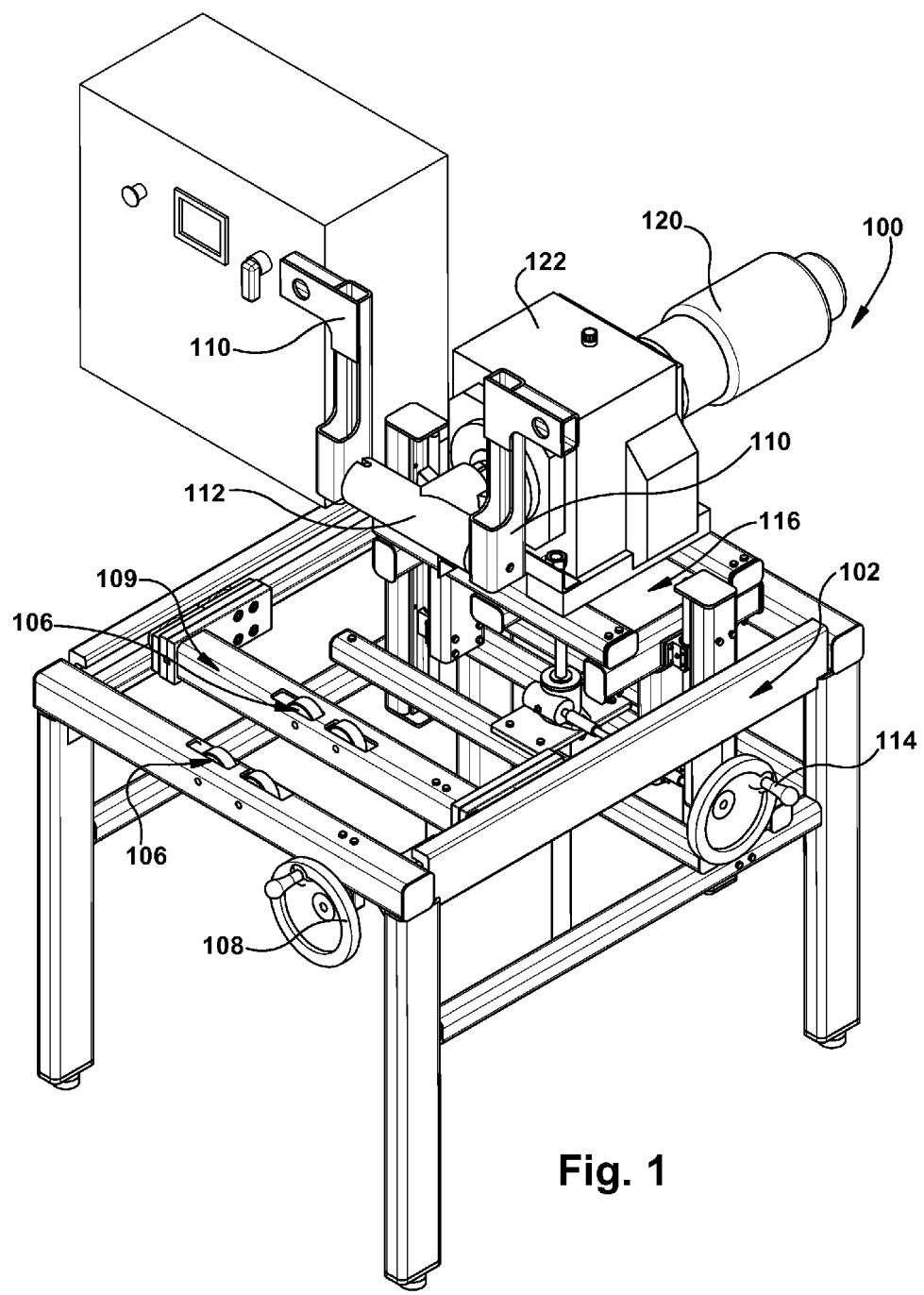
FIG. 1 shows a perspective view of a bearing manipulator according to aspects of the invention.

It is noted that the drawings of the invention are not necessarily to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

Turning to FIG. 1, a bearing manipulator 100 is shown according to an embodiment of this invention. Bearing manipulator 100 is used to support and manipulate a bearing 104 (shown in FIG. 2) during welding. While a half bearing 104 is shown in the figures, it is understood that embodiments of this invention can also be used to manipulate a full bearing, or any other portion of a bearing. However, for purposes of illustration in the figures and in this description, a half bearing, i.e., a circular bearing cut in half, will be described.

Figure 2:
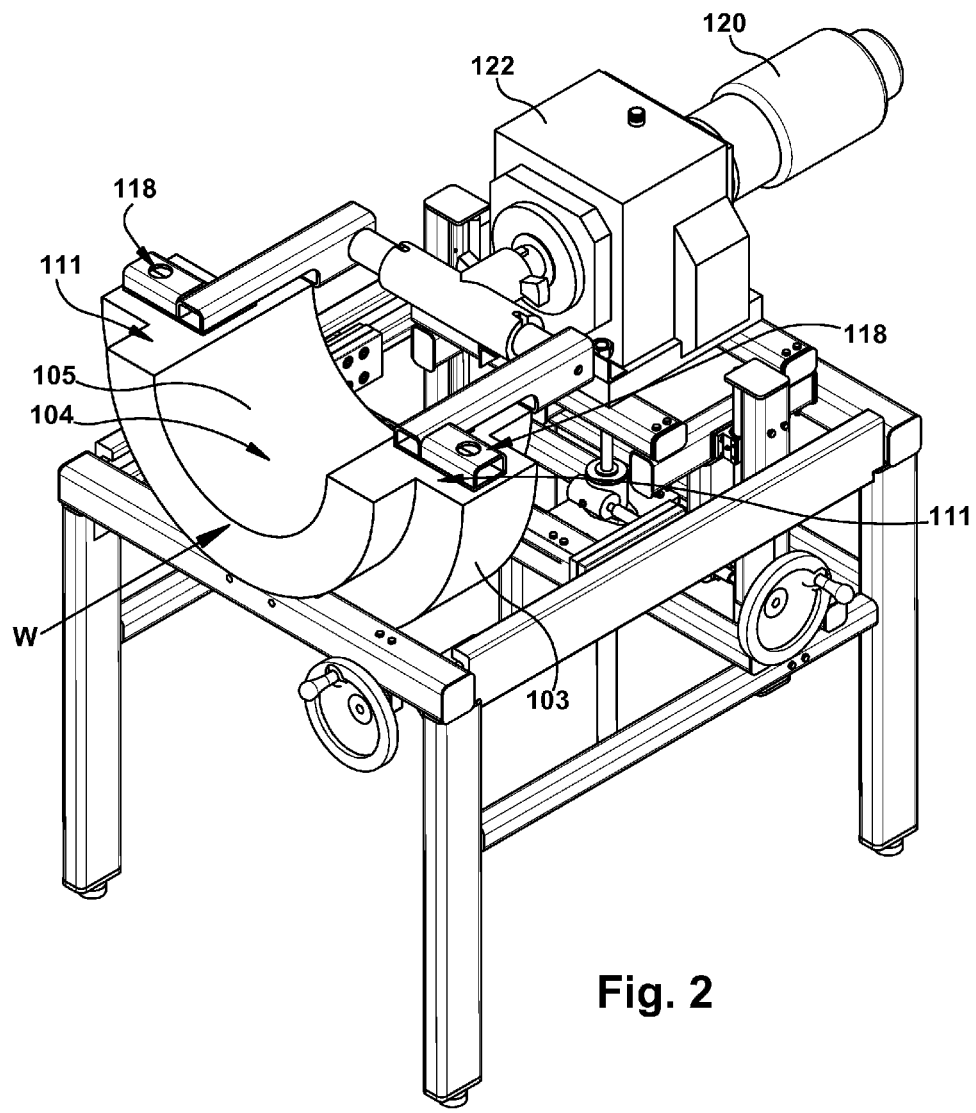
FIG. 2 shows a perspective view of a bearing manipulator including a bearing positioned thereon, according to aspects of the invention.

As understood by one of skill in the art, and shown in FIG. 2, bearing 104 has an outer surface 103 and an inner surface 105. Inner surface 105 is the surface through which a rotating component (not shown) will be inserted in operation in a turbomachine. Therefore, it may be desirable to include a sacrificial layer, e.g., a Babbitt metal, on inner surface 105. As understood by one of skill in the art, for best results, a weld would be deposited at the lowest point of bearing surface 105, illustrated by arrow W in FIG. 2, indicating where a weld is made. Therefore, bearing 104 needs to be continuously manipulated, i.e., rotated, so that every portion of surface 105 is, at one point, located at the lowest point. In this way, the entire inner surface 105 can be welded. Embodiments of the invention described herein provide a way to more easily access the entire surface of inner surface 105 of bearing 104 in order to deposit a weld as desired.

As shown in FIG. 1, bearing manipulator 100 includes a frame 102 for supporting a bearing 104. Frame 102 can comprise any configuration of legs and support pieces as known in the art. In the example shown in FIGS. 1-4, a frame in the general shape of a table is shown with four legs and an open top, but it is understood that any configuration or shaped frame can be used. As shown in FIG. 1-4, frame 102 can be raised off the floor such that a weld operator (or automated welding apparatus) can access a bearing 104 placed on frame 102. As best shown in FIG. 1, a top surface of frame 102 includes at least one adjustable roller 106 on which a bearing 104 is placed. FIG. 1 shows four such adjustable rollers 106 (two sets of two rollers 106), but it is understood that more or less rollers 106 can be used. Adjustable rollers 106 are configured such that an outer surface 103 of bearing 104 (FIG. 2) contacts adjustable rollers 106, and rollers 106 allow (or cause) bearing 104 to be rotated as discussed herein. Adjustable rollers 106 further act to support bearing 104 when bearing 104 is placed on frame 102.

Frame 102 further includes a horizontal adjustment system 108 for adjusting system 100 to accommodate a width of bearing 104. For example, horizontal adjustment system 108 can adjust a portion of frame 102 and/or the plurality of adjustable rollers 106. In the embodiment shown in FIG. 1, horizontal adjustment system 108 includes a wheel which, when turned, moves a horizontal adjustment rail 109. This in turn can move at least some of the rollers 106. In this way, a portion of frame 102 and rollers 106 can be adjusted to accommodate a width of bearing 104. It is understood that other components of frame 102 can be adjusted to fit bearing 104, for example, a plurality of support pieces along the top of frame 102 can be moved so that bearing 104 can sit on frame 102. It is also understood that other horizontal adjustment systems can be used to adjust frame 102 to fit a width of bearing 104. For example, a hydraulic system could be used to move one or more rails of frame 102. In another example, the rails of frame 102 can be adjusted by hand (for example, the rails could be on rollers with brakes to lock them in place), or the rails could be slid back and forth through other known robotic means. In yet another example, frame 102 could include an angled top surface having rollers positioned at an angle such that a bearing would slide down the tapered surface into position. In this way, different sized bearings could be used because each bearing would slide down the rollers depending on its size, for example, smaller bearings would sit lower on the frame than larger bearings.

Frame 102 further includes at least one adjustable arm 110 configured to attach to bearing 104. Two such arms 110 are shown in FIGS. 1 and 2, but it is understood that more or less arms can be used. In the embodiment shown in FIGS. 1 and 2, two arms 110 are connected by a collar 112, and arms 110 are configured to flip down to contact two horizontal surfaces 111 of bearing 104. FIG. 1 shows arms 110 in a vertical position before securing to bearing 104, and FIG. 2 shows arms 110 after they have been moved to contact bearing 104. It is noted that in the example shown in FIGS. 1-4, bearing 104 comprises a half bearing, so therefore has two substantially parallel horizontal surfaces 111, as shown in FIG. 2. It is understood that if a whole bearing is used, arms 110 can be configured differently to contact a different portion of bearing 104. For example, arms 110 could contact inner surface 105 of bearing 104, or could contact outer surface 103 of bearing 104.

Frame 102 further includes a vertical adjustment system 114 for adjusting a portion of frame 102 and/or motor/gearbox assembly 120, 122 to accommodate a height of bearing 104. For example, vertical adjustment system 114 can be configured to adjust arms 110 and/or a gear box 122. In the embodiment shown in FIGS. 1 and 2, vertical adjustment system 114 includes a wheel which, when turned, moves a vertical adjustment surface 116. Arms 110 and/or gear box 122 are coupled to surface 116, so when surface 116 is moved, arms 110 and gear box 122 are also moved up and down relative to frame 102 and bearing 104. In this way, arms 110 can be adjusted to accommodate a height of bearing 104. In the example shown in FIG. 2, arms 110 are adjusted so that arms 110 can contact horizontal surfaces 111 of bearing 104. It is understood that arms 110 can be adjusted directly, or can be adjusted by moving a surface (such as surface 116) to which they are coupled. It is also understood that other vertical adjustment systems can be used to adjust arms 110 and gear box 122, for example, a hydraulic system could be used to move arms 110 up and down to achieve the desired height. In another example, bearing 104 could be moved up and down instead of gear box 122 and/or arms 110. For example, the rails of frame 102 could be moved up and down to accommodate different heights of bearing 104. In another example, bearing 104 could be moved into the correct height through the use of tapered rollers, where the space between rollers could be adjusted such that when bearing 104 is placed on the rollers, bearing 104 would sit in the desired position. For example, rollers could be closer together for smaller bearings and farther apart for larger bearings, so the larger bearing would sit lower on frame 102 than the smaller bearing, but the top of both bearings would be at substantially the same level. In another embodiment, a separate axis could be provided for the motor/gear box assembly 120, 122 and arms 110. In this way, only arms 110 would need to be adjusted and a belt or chain could be used as a tensioner.

Arms 110 are also configured such that they can be removably attached to bearing 104. For example, as shown in FIG. 2, bolts can be used at contact points 118 between arms 110 and horizontal surfaces 111 to bolt arms 110 to bearing 104. It is understood that any other attachment means can be used, such as, but not limited to, a screw, a pin, friction, adhesive, or a clamp.

As shown in FIGS. 1 and 2, bearing manipulator 100 further includes a motor 120 for incrementally moving bearing 104. In one example, motor 120 can be coupled to a gear box 122, and gear box 122 can be coupled to collar 112 and arms 110. Motor 120 can then therefore move arms 110 which in turn move bearing 104, as discussed in more detail herein. In another example, motor 120 can be coupled to rollers 106 or another portion of frame 102 to move bearing 104 as discussed herein.

In operation, a bearing 104 is placed on frame 102. To accomplish this, a user can first prepare bearing manipulator 100 to fit bearing 104, for example, a user can use horizontal adjustment system 108 to adjust frame 102 and rollers 106 to fit the width of bearing 104, for example, by turning a wheel until horizontal adjustment rail 109 is in the correct position so that rollers 106 fit the width of bearing 104. Once rollers 106 and frame 102 are adjusted, bearing 104 is placed on frame 102, such that outer surface 103 sits on rollers 106, and inner surface 105 is facing up and is accessible. Typically, a crane (not shown) is used to lift and place bearing 104 onto frame 102.

Figure 3:
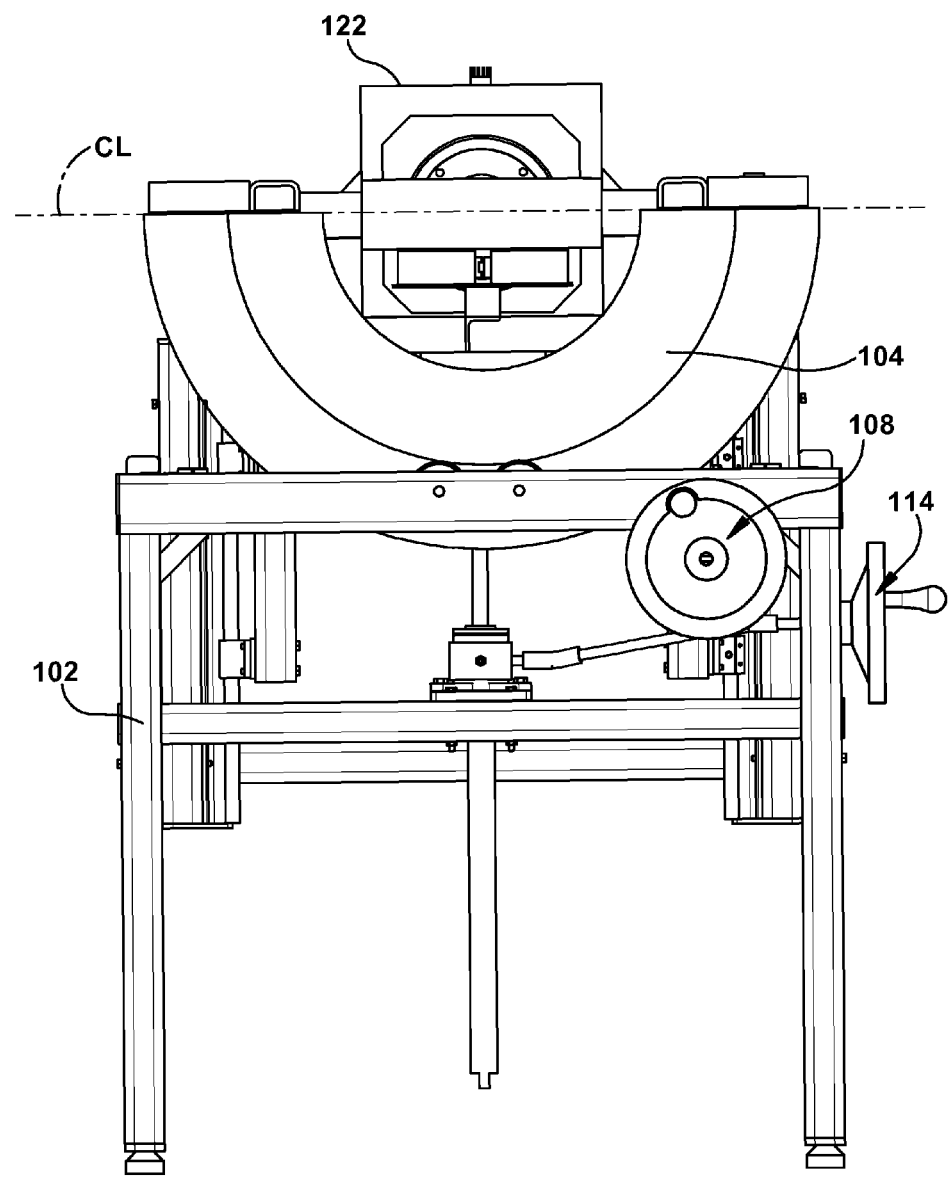
FIG. 3 shows a front view of a bearing manipulator including a bearing positioned thereon, according to aspects of the invention.

Once bearing 104 is in place (or prior to placing bearing 104), arms 110 can be adjusted to accommodate a height of bearing 104, and gear box 122 and/or bearing 104 can be adjusted such that a center line, CL, (i.e., radius) of bearing 104 lines up with a center line, CL, of gear box 122, as shown in FIG. 3. For example, a user can use vertical adjustment system 114, e.g., a wheel, to move gear box 122 and/or arms 110 up and down. In the embodiment shown in FIGS. 1-3, moving gear box 122 also moves arms 110 to accommodate the height of bearing 104, but as discussed herein, arms 110 can be adjusted in various ways. Once bearing 104 and gearbox 122 are positioned correctly, arms 110 are lowered such that they contact bearing 104 (see e.g., FIG. 1, with arms 110 in raised position, and FIG. 2, with arms 110 lowered to contact bearing 104). In one example, two arms 110 contact two horizontal surfaces 111 of bearing 104. Arms 110 can then be secured to bearing 104, for example, using at least one bolt.

Once bearing 104 is in position and is secured, a weld can be applied to inner surface 105, as illustrated by arrow W in FIG. 2. Welding can be done manually or through an automated welding apparatus. After a weld is applied, motor 120 incrementally rotates bearing 104. Any known means of activating motor 120 and gear box 122 can be used, for example, a foot pedal can be used to activate motor 120 and rotate bearing 104.

Motor 120 and gear box 122 can be coupled to a control system as known in the art, to allow a user to program motor 120 to operate as desired. For example, the degree to which bearing 104 is rotated can be any degree set by a user, in one example, it can depend on the width of the weld being applied. For example, if a ¼ inch weld is applied to bearing 104, motor 120 will rotate bearing 104 to a degree sufficient to move the bearing approximately ¼ inch, so that the next weld is applied on a fresh, unwelded surface. Therefore, bearing 104 can be rotated by an increment substantially equivalent to the thickness of the weld being applied, i.e., the translation distance of the weld. It is understood that any other rotation increments can be used.

Figure 4:
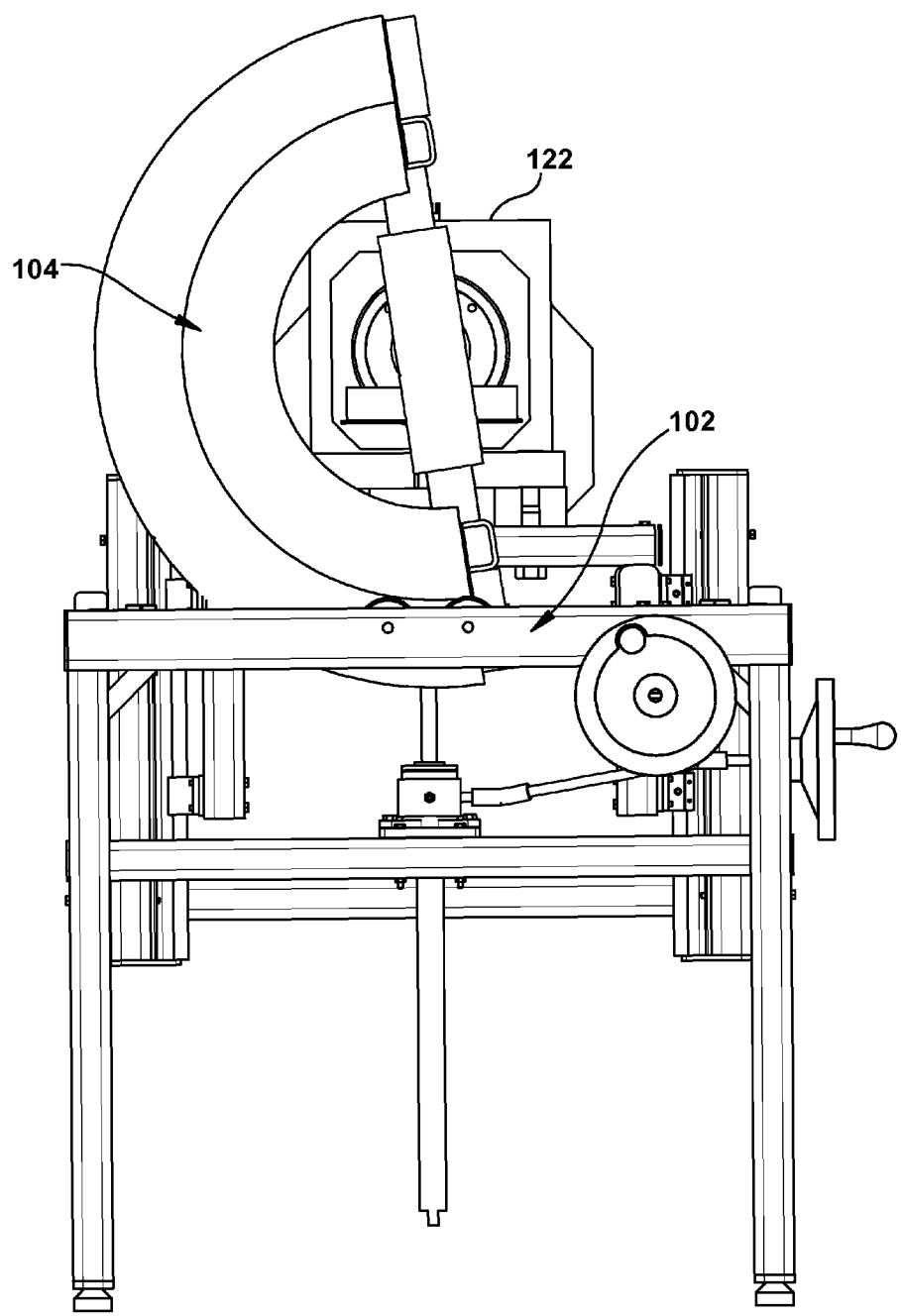
FIG. 4 shows a front view of a bearing manipulator including a bearing positioned thereon, according to aspects of the invention, illustrating rotation of the bearing with respect to the frame of the bearing manipulator.

From the horizontal, resting, position shown in FIGS. 2 and 3, bearing 104 can be rotated up to approximately 90 degrees in either direction, i.e., clockwise or counterclockwise, with respect to a horizontal plane of frame 102, allowing the entire surface 105 of bearing 104 to, at some point, be positioned at the lowest point of bearing 104. Limit switches can be included to prevent over rotation of bearing 104. The rotation of bearing 104 with respect to frame 102 is illustrated in FIG. 4. Bearing manipulator 100 is referred to as an elliptical bearing manipulator because bearing 104 is rotated in an elliptical, curved, arc.

Bearing manipulator 100 therefore acts to support and automatically rotate bearing 104 as needed through a welding process, eliminating or reducing the need for a crane or other equipment to incrementally move bearing 104 between welds. In contrast to previously known systems, bearing manipulator 100 is universal, in that it can be adjusted vertically and horizontally to hold and rotate any size bearing 104 typically used in a medium to large turbomachine, without making any modifications to the bearing. In addition, bearing manipulator 100 uses an automated motor 120 to rotate bearing 104 for any desired welding position, for example, to rotate bearing 104 through a full rotation to allow welding to occur at the lowest height of bearing 104 and still weld an entire inner surface of the bearing. Because motor 120 can be programmed to rotate bearing 104 by a specific amount, e.g., the width of a weld, bearing manipulator 100 reduces user error, since it does not rely on a user to manually rotate the bearing as needed after each weld. Therefore, the possibility of inadequate weld pass overlap is reduced. In addition, bearing manipulator 100 uses frame 102 to support the weight of bearing 104, for example, on rollers 106 on a support rail of frame 102, as opposed to previously known systems that rely on a suspended or cantilevered design. Using frame 102 to support bearing 104 therefore improves safety when manipulating the large bearings typically used in turbomachines.

In one embodiment, motor 120 can be configured to move gear box 122, which in turn moves arms 110, which are secured to bearing 104. Therefore, motor 120 can move bearing 104. Rollers 106 can also act to assist bearing 104 in moving, allowing outer surface 103 to slide along rollers 106 as bearing 104 is rotated. In another embodiment, rather than just passively assisting in allowing bearing 104 to rotate, rollers 106 can be coupled to a motor to act as the driving mechanism to rotate bearing 104. In this embodiment, rollers 106 can be solely responsible for rotating bearing 104, or can act in conjunction with arms 110 to rotating bearing 104. In yet another embodiment, if a full bearing is used (in contrast to the half bearing shown in FIGS. 1-4), motor 120 could be configured to move a wheel that rolls bearing 104 through direct contact from underneath. The wheel can be adjustable depending on the compressibility of the wheel.

It is understood that while aspects of the invention disclosed herein relate to supporting and manipulating a bearing during welding, the bearing manipulator disclosed herein can be used to support and manipulate a bearing during any desired process, for example, assembly, inspection, and/or machining.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An elliptical bearing manipulator comprising:
   a frame including:
      at least one adjustable roller being adjustable in a horizontal direction relative to a fixed roller and configured to support a bearing;
      at least one adjustable arm being adjustable in a vertical direction relative to a horizontal plane of the frame and configured to attach to the bearing; and
   a motor configured to incrementally rotate the bearing via the at least one adjustable arm.

2. The elliptical bearing manipulator of claim 1, wherein the frame supports the bearing during at least one of: welding, assembly, inspection, and machining.

3. The elliptical bearing manipulator of claim 1, wherein the bearing can be rotated up to approximately 90 degrees with respect to the horizontal plane of the frame.

4. The elliptical bearing manipulator of claim 1, wherein the bearing comprises either a bearing or a half bearing.

5. The elliptical bearing manipulator of claim 1, wherein at least one of: a portion of the frame and the at least adjustable one arm is configured to be adjusted to accommodate a height of the bearing.

6. The elliptical bearing manipulator of claim 1, wherein at least one of: a portion of the frame and the at least one adjustable roller is configured to be adjusted to accommodate a width of the bearing.

7. The elliptical bearing manipulator of claim 1, wherein the at least one adjustable arm is attached to the bearing by a bolt, a screw, a pin, friction, adhesive, or a clamp.

8. The elliptical bearing manipulator of claim 1, wherein the bearing is incrementally rotated by an increment substantially equivalent to a thickness of a weld applied to the bearing.

9. The elliptical bearing manipulator of claim 1, wherein the motor is coupled to at least one of: the at least one adjustable arm and the at least one adjustable roller, and wherein the motor rotates at least one of the at least one adjustable arm and the at least one adjustable roller to incrementally rotate the bearing.

10. A method of manipulating a bearing, the method comprising:
    providing a frame adapted for supporting the bearing, the frame having at least one adjustable roller and at least one adjustable arm, the at least one adjustable roller being adjustable in a horizontal direction relative to a fixed roller and configured to support the bearing and the at least one adjustable arm being adjustable in a vertical direction relative to a horizontal plane of the frame and configured to attach to the bearing;

placing the bearing on the at least one adjustable roller; and using a motor to incrementally rotate the bearing.

11. The method of claim 10, further comprising:

adjusting at least one of: a portion of the frame and the at least one adjustable roller to fit a width of the bearing;

adjusting at least one of: a portion of the frame and the at least one adjustable arm to fit a height of the bearing such that each arm contacts the bearing; and removably attaching each adjustable arm to the bearing.

12. The method of claim 10, further comprising:

applying a plurality of welds to a surface of the bearing; and incrementally rotating the bearing after each weld is applied.

13. The method of claim 12, wherein the bearing is incrementally rotated by an increment substantially equivalent to a thickness of the weld applied to the bearing.

14. The method of claim 10, wherein the bearing is rotated up to approximately 90 degrees with respect to the horizontal plane of the frame.

15. The method of claim 10, wherein the bearing comprises either a bearing or a half bearing.

16. The method of claim 10, wherein each adjustable arm is removably attached to the bearing by: a bolt, a screw, a pin, friction, adhesive, or a clamp.

17. The method of claim 10, wherein the motor is coupled to at least one of: the at least one adjustable arm and the at least one adjustable roller.

18. The method of claim 10, further comprising at least one of: welding, assembling, inspecting, and machining the bearing.

* * * * *